United States Patent [19]
Kieser et al.

[11] Patent Number: 4,782,593
[45] Date of Patent: Nov. 8, 1988

[54] CHAIN SAW WITH A STOPPING DEVICE

[75] Inventors: Hermann Kieser, Nürtingen; Norbert Schur, Metzingen, both of Fed. Rep. of Germany

[73] Assignee: Metabowerke GmbH & Co., Nürtingen, Fed. Rep. of Germany

[21] Appl. No.: 20,099

[22] Filed: Feb. 27, 1987

[30] Foreign Application Priority Data

Mar. 6, 1986 [DE] Fed. Rep. of Germany ....... 3607376

[51] Int. Cl.$^4$ .............................................. B27B 17/02
[52] U.S. Cl. .................................... 30/382; 188/77 R; 192/12 BA
[58] Field of Search .................................. 30/381–387; 192/12 BA, 26, 33 C, 81 C; 198/74, 77 R

[56] References Cited
U.S. PATENT DOCUMENTS 3,361,165 1/1968 Irgens ................................ 192/26 X
4,625,406 12/1986 Fushiya et al. ....................... 30/381

Primary Examiner—Douglas D. Watts
Attorney, Agent, or Firm—Peter K. Kontler

[57] ABSTRACT

A portable chain saw wherein the motor drives a hub which is coaxial with a cylindrical portion of the shaft for one sprocket wheel of the chain. A coil spring is wound around the hub and the cylindrical portion to normally transmit torque from the hub to the shaft and to brake the shaft in response to its disengagement from the hub as a result of pivoting of a guard for one hand of the operator. The guard is pivoted by the one hand when the chain saw wobbles or performs other undesirable movements. The coil spring, the hub and the cylindrical portion together constitute a so-called wrap spring clutch wherein the spring rotates with the hub until arrested by a pin-shaped decoupling element which is movable radially of the hub by a second spring in response to pivoting of the guard.

15 Claims, 2 Drawing Sheets

CHAIN SAW WITH A STOPPING DEVICE

BACKGROUND OF THE INVENTION

The invention relates to portable power-operated tools in general, especially to power-operated portable chain saws. More particularly, the invention relates to improvements in portable power tools of the type wherein a sensor (such as a pivotable hand guard or the like) is provided on the housing to be displaced by hand in the event of an emergency (e.g., when the hand or hands of the operator cannot adequately control the movements of the housing) and to thereby actuate a brake for that part or for those parts which receive torque from the prime mover and can be disengaged from the prime mover by a clutch.

A portable power-operated chain saw of the above outlined character is disclosed in German Auslegeschrift No. 22 17 707. This chain saw employs a flywheel type clutch and a discrete hand brake for those rotary parts of the portable tool which are disconnected from the prime mover in response to disengagement of the clutch. In order to be effective, the brake must be designed in such a way that it can also brake the prime mover, at least until the clutch is disengaged. This necessitates the utilization of a large, complex, bulky and expensive brake and entails at least some delay in stoppage of the chain because the brake must decelerate large masses including those which are positively driven when the clutch is engaged as well as the prime mover and the parts which transmit torque from the prime mover to the clutch. It has been found that the just described portable chain saw cannot ensure a prevention of accidents in the event of excessive and uncontrollable stray movements of the housing, i.e., when it becomes necessary to displace the guard so as to disengage the clutch, even though the chain saw is equipped with costly, complex, bulky and expensive safety devices.

It was further proposed to provide a portable chain saw with an electric motor whose output member is directly connected with the part or parts which drive the chain. A large brake is provided to decelerate the motor in the event of an emergency. Such portable tools are relatively simple but the interval which elapses for deceleration of the motor and of the saw is too long.

OBJECTS AND SUMMARY OF THE INVENTION

An object of the invention is to provide a portable power-operated tool, particularly a chain saw, which is constructed and assembled in such a way that the parts which receive torque from the clutch can be braked without the need for the provision of a discrete brake therefor.

Another object of the invention is to provide a portable power-operated tool wherein the parts which rotate one or more rotary tool driving devices (such as one or more sprocket wheels if the driven tool is an endless chain) can be adequately braked by a reliable brake and can also be decoupled from the prime mover even though the portable tool does not embody a discrete clutch.

A further object of the invention is to provide a portable power-operated tool wherein the prime mover can be immediately disconnected from the parts which actually drive a chain or another tool when the need for such disconnection arises, and wherein the mass of the aforementioned parts is small or very small so that they can be immediately or very rapidly decelerated to zero speed.

An additional object of the invention is to provide a portable power-operated tool wherein the clutch between the prime mover and the part or parts which drive one or more tools can perform other important and useful functions.

Still another object of the invention is to provide a portable power-operated tool wherein the brake for the parts which transmit motion to one or more tools can perform one or more additional useful functions.

Another object of the invention is to provide a portable power-operated tool, such as a chain saw, which exhibits the above outlined features and is further constructed and assembled in such a way that the operator is unlikely to accidentally start the prime mover, and wherein the prime mover can be started only when the clutch is ready to transmit torque to the part or parts which drive the tool or tools.

A further object of the invention is to provide a novel and improved method of rapidly and reliably terminating the movements of the tool or tools in a portable power-operated tool when the operator proceeds to disengage the clutch.

The invention is embodied in a portable power-operated tool, particularly in a portable chain saw, which comprises a housing, a prime mover (e.g., a variable-speed electric motor) which is carried by the housing and has a rotary output member, a rotary tool driving member which is mounted in the housing, a so-called wrap spring clutch which is interposed between the two members to rotate the driving member in response to rotation of the output member, and means for disengaging the clutch including a manually displaceable disengaging element on the housing (particularly a guard for one hand of the operator of the portable tool). The clutch includes means (such as a coil spring) for braking the driving member in response to manual displacement of the disengaging element so that the driving member is braked substantially simultaneously with interruption of transmission of torque thereto. Thus, the clutch can perform the function of transmitting torque from the output member of the prime mover to the driving member for the tool as well as the function of a means for braking the driving member in response to manual displacement of the disengaging element to thus reduce the likelihood of damage to the portable tool and/or injury to the operator.

The clutch preferably comprises a first component (e.g., a component including a gear and a first cylinder forming part of the hub of the gear) which is driven by the output member of the prime mover, a second component (e.g., a second cylinder which is coaxial with but is rotatable relative to the first cylinder) in the driving member, and a prestressed coil spring which surrounds and normally frictionally engages the cylinders. The spring constitutes the braking means and is disengageable from at least one of the components (particularly from the first component) in response to manual displacement of the disengaging element. The first and second components preferably comprise first and second abutments, respectively, and the spring has first and second end convolutions which are respectively adjacent the first and second abutments so that the spring is held against axial movement relative to the components of the clutch (the spring is disposed between the first and second abutments).

The gear of the first component can mesh directly with a gear on the output member of the prime mover. The aforementioned hub is coaxial with the gear of the first component and is surrounded by the spring. A portion of the driving member (e.g., a shaft which is mounted in cantilever fashion) is preferably surrounded by and is rotatable relative to the hub of the first component. The driving member is rotatably journalled in the housing and, if the portable tool is a chain saw, the portable tool further comprises a sprocket wheel which is affixed to the driving member and a chain which is trained over the sprocket wheel. The sprocket wheel is preferably mounted on the driving member in overhung position adjacent the second component of the clutch. Antifriction bearing means (e.g., one or more needle bearings) can be interposed between the aforementioned portion of the driving member and the hub.

The first component is caused to rotate in a predetermined direction (e.g., clockwise) in response to starting of the prime mover, and the convolutions of the coil spring which forms the braking means of the clutch are wound around the two cylinders in such a way that the diameters of the convolutions tend to decrease in response to rotation of the first component and the convolutions are in pronounced frictional torque transmitting engagement with the cylinders of the first and second components. In other words, the coil spring is normally rotated by the prime mover about an axis which coincides with the common axis of the two cylinders because the initial stressing of the spring is such that its convolutions bear against the peripheral surfaces of the adjacent cylinders. In order to disengage the spring from the cylinder of the first component, i.e., to prevent the spring from transmitting torque to the cylinder of the second component, it is necessary to prevent the spring from rotating the cylinder of the first component so that the spring can brake but cannot rotate the cylinder of the second component. The disengaging means of the improved portable tool includes means for interrupting the rotation of the spring with the first component in response to displacement of the disengaging element, and such rotation interrupting means preferably comprises a stop which is engageable with an outwardly extending portion of the spring in the region of the cylinder of the first component of the clutch in response to manual displacement of the disengaging element to thereby prevent the spring from rotating with the first component. The stop can include a reciprocable decoupling element and the interrupting means further comprises means for biasing the decoupling element to a position in which the decoupling element extends into the path of orbital movement of the aforementioned portion of the spring. The disengaging means further comprises retracting means for normally maintaining the decoupling element away from the path of movement of the aforementioned portion of the spring. The decoupling element is or can be mounted for reciprocatory movement substantially at right angles to the axes of the components of the clutch, preferably substantially radially of the cylinder of the first component.

The portable tool further comprises means for starting the prime mover, manually disengageable means for normally blocking the operation of the starting means, and means (such as a helical spring) for engaging the stop with the aforementioned portion of the coil spring in response to blocking of the operation of the starting means by the blocking means, i.e., the clutch is disengaged when the prime mover is idle. The helical spring of the engaging means biases the reciprocable decoupling element of the stop for the coil spring to a position in which the decoupling element extends into the path of movement of the coil spring. The disengaging means further comprises the aforementioned retracting means (such as a two-armed lever) for normally maintaining the decoupling element away from the path of movement of the coil spring. The lever of the retracting means has a first arm which cooperates with the disengaging element and a second arm which cooperates with the blocking means. As mentioned above, the helical spring of the biasing means urges the decoupling element toward the first component so that a tip of the decoupling element can move into the path of orbital movement of the aforementioned portion of the coil spring. Friction reducing means can be interposed between the arms of the retracting lever and the disengaging element and the blocking means, respectively; such friction reducing elements can constitute rollers on the end portions of the first and second arms of the retracting lever.

A hub of the retracting lever is preferably designed to receive a portion of the biasing means and to reciprocably receive a portion of the decoupling element.

As mentioned above, the disengaging element can comprise or constitute a guard for a hand which holds the housing when the portable tool is in use, and such guard is preferably pivotable with reference to the housing between a first position in which the clutch is engaged and a second position in which the clutch is disengaged. The guard can be provided with a seat and the first arm of the retracting lever has a portion (such as the respective friction reducing means) which engages the seat in the first position of the guard. The latter is pivotable to the second position by the hand of the operator of the portable tool to thereby disengage the seat from the first arm of the retracting lever whereby the biasing means is free to move the decoupling element into the path of movement of the aforementioned portion of the coil spring.

The blocking means is preferably designed to prevent the operation of the starting means for the prime mover when the clutch transmits torque to the driving member. The starting means can comprise an electric switch (if the prime mover includes an electric motor) and an actuator for the switch. The actuator is movable by hand when the blocking means is disengaged, preferably by the hand which tends to move the actuator. The blocking means can comprise a blocking lever which is pivotable in the housing of the portable tool and has a first arm which constitutes the aforementioned preventing means, a second arm which is displaceable by hand to move the first arm away from the actuator (i.e., to allow for closing of the switch), and a third arm which serves to disengage the clutch when the first arm prevents the actuator from closing the switch. One of the three arms of the blocking lever can be disposed at right angles to the other two arms. The third arm of the blocking lever is normally coupled to the respective arm of the retracting lever. The housing is preferably provided with an opening (preferably in the upper or top wall of the housing), and the second arm of the blocking lever normally extends from the housing by way of such opening or is accessible to the hand of the operator by way of the opening. A portion of the actuator for the switch is preferably arranged to abut the first arm of the blocking lever and to thus prevent the actuator from closing the switch when the second arm of the blocking lever is not displaced by hand. The third arm of the blocking lever can be provided with a socket for the friction preventing means on the respective arm of the retracting lever.

The novel features which are considered as characteristic of the invention are set forth in particular in the appended claims. The improved portable tool itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
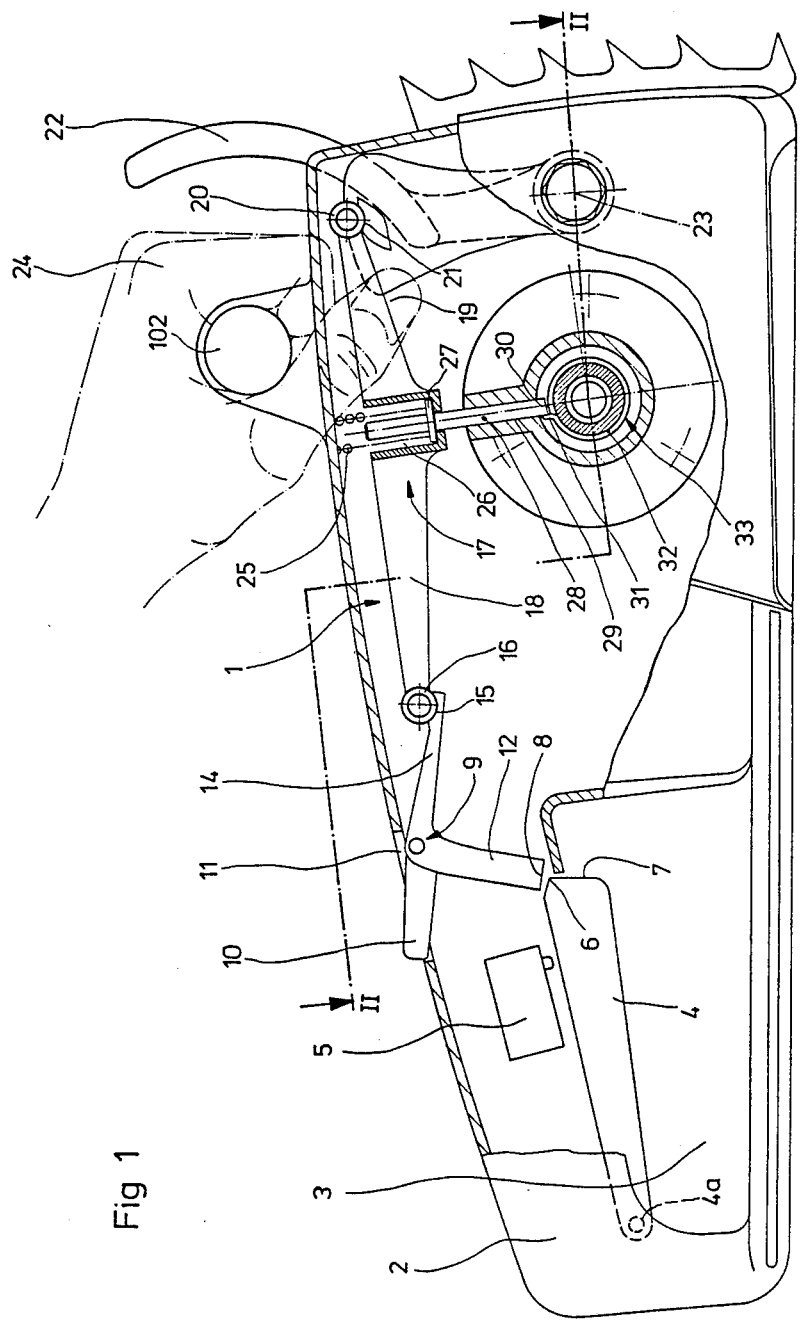
FIG. 1 is a fragmentary partly elevational and partly sectional view of a portable chain saw which embodies the invention, the section being taken in the direction of arrows as seen from the line I—I of FIG. 2.
Figure 2:
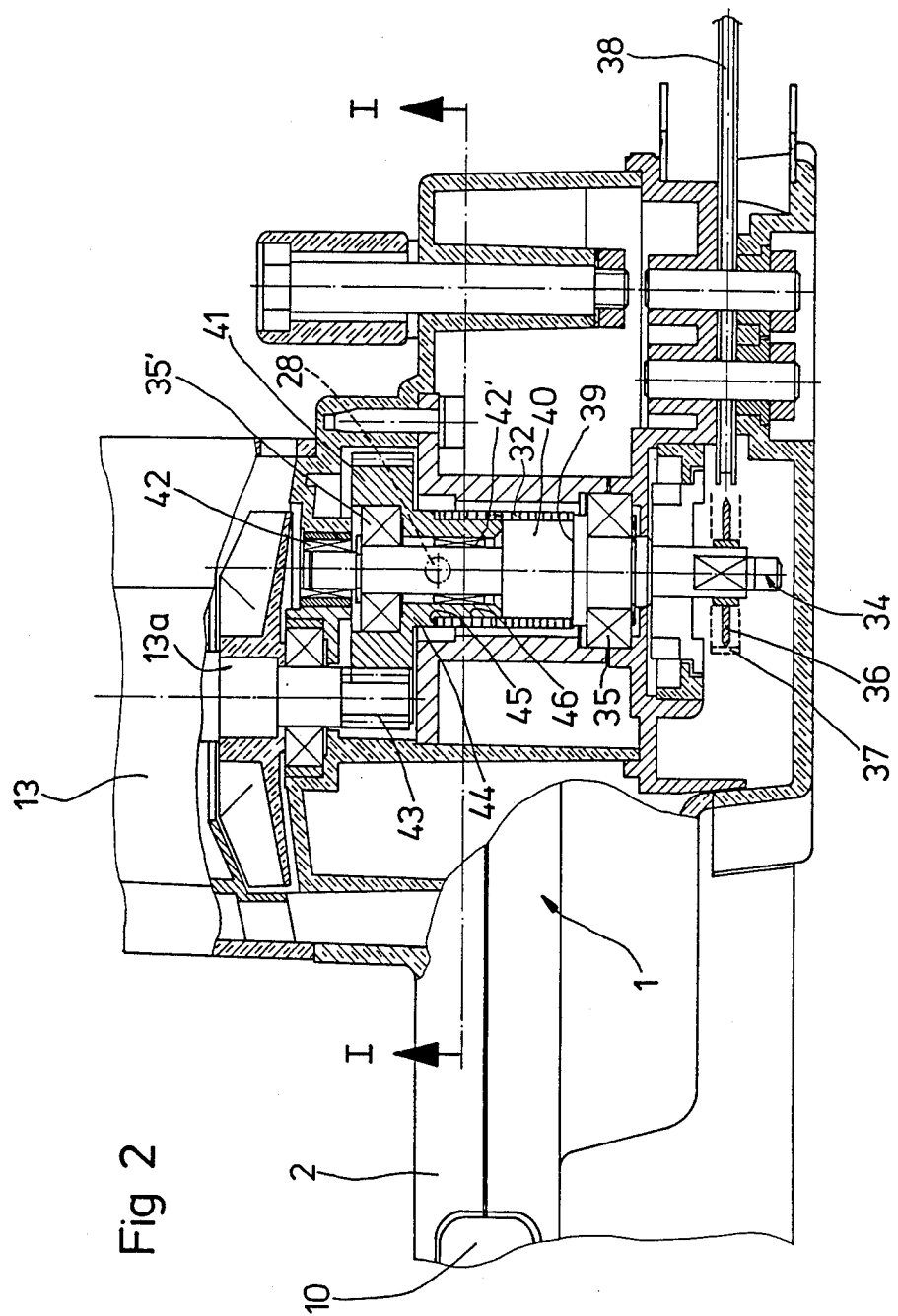
FIG. 2 is a fragmentary sectional view as seen in the direction of arrows from the line II—II of FIG. 1.

The portable chain saw which is shown in FIGS. 1 and 2 comprises a housing 1 having a handle 2 for one hand of the operator. The handle 2 has an opening 3 for four fingers of the hand which grasps the handle, and a pivotable actuator 4 for a starter switch 5 in the interior of the housing 1. The actuator 4 is installed in a slot of the top wall bounding the opening 3 in the handle 2 and has a free end portion 7 which is remote from the pivot member 4a and comprises an edge face 6 movable into engagement with a stop 8 at the free end of one (12) of three arms of a blocking lever 9 which is pivotably mounted in the housing 1 at a level above the opening 3. The stop 8 normally prevents a pivoting of the actuator 4 which is necessary to close the switch 5, and this stop can be pivoted out of the way of the edge face 6 in response to pivoting of the blocking lever 9 by the thumb of the hand whose other four fingers extend into the opening 3. The thumb of such hand can pivot a second arm 10 which forms part of the blocking lever 9 and normally projects from the housing 1 through an opening 11 in the top wall of the handle 2 sufficiently close to the opening 3 to ensure that the thumb can readily reach the arm 10 while the other four fingers extend into and through the opening 3. The starter switch 5 serves to complete the circuit of an electric motor (prime mover) 13 which then drives an endless chain 37.

The third arm 14 of the blocking lever 9 is confined in the housing 1 and carries at its free end a socket 15 for the roller 16 at the free end of one arm 18 of a two-armed retracting lever 17 in the housing 1. The arrangement is such that the roller 16 extends into the socket 15 of the arm 14 from above when the housing 1 is held in the normal position or orientation so that the opening 11 is located at a level above the opening 3. The purpose of the roller 16 is to reduce friction between the levers 9 and 17 by preventing direct engagement of the arm 18 with the arm 14.

The free end of the other arm 19 of the retracting lever 17 also carries a friction reducing roller 29 which normally extends from above into a socket 21 provided therefor in a pivotable one-armed brake-engaging clutch-disengaging guard 22 pivotable in the housing 1 about a pivot member 23. The upper portion of the guard 22 projects from the housing 1 to be within reach of the other hand 24 of the operator while the other hand grasps a second handle 102 of the housing 1. The pivot member 23 is preferably disposed substantially midway between the top and bottom walls of the housing 1, and the guard 22 is pivotable by the hand 24 in a clockwise direction as seen in FIG. 1 when the portable saw begins to wobble or perform other stray movements which warrant an interruption of transmission of motion between the output member 13a of the motor 13 and the endless chain 37. The angular displacement of the guard 22 under the action of the hand 24 need not be pronounced. When the guard 22 has been pivoted clockwise to the position of FIG. 1, the socket 21 has moved away from the roller 20 and the lever 17 was free to follow the bias of a prestressed helical spring 25 which biases the lever 17 axially, i.e., substantially at right angles to the imaginary line which connects the axes of the rollers 16 and 20 in FIG. 1. The convolutions of the helical spring 25 (which reacts against the underside of the top wall of the housing 1) extend into a sleeve-like hub 26 of the lever 17 and the lowermost convolution of such spring bears upon a collar 27 provided on a decoupling element 28. The hub 26 is (but need not be) disposed substantially midway between the rollers 16 and 20. The decoupling element 28 is reciprocable in a tubular guide 29 in the axial direction of the helical spring 25 and its lower end portion 30 constitutes an abutment or stop for one end portion 31 of a prestressed coil spring 32 forming part of a so-called wrap spring clutch 33 interposed in the power train between the motor 13 and the chain 37.

FIG. 2 shows that the gear 43 on the output element of the motor 13 mates with a larger gear 41 which is connected with the driving member 34 for a sprocket wheel 36 by way of the clutch 33. The chain 37 is trained over the sprocket wheel 36 and preferably over at least one additional sprocket wheel (not shown) and travels around a so-called sword 38 which is bolted or otherwise rigidly secured to the housing 1. The major part of the sword 38 extends from the housing 1. The driving member 34 for the sprocket wheel 36 is rotatable in two antifriction bearings 35 and 35' which are respectively installed in the housing 1 and in the gear 41. The sprocket wheel 36 is mounted on the free end portion of the driving member 34 in overhung position.

The driving member 34 is rigidly connected or is integral with a cylindrical drum-shaped component 40 of the clutch 33. The component 40 has an abutment in the form of a shoulder 39 and is coaxial with the gear 41 which mates with the gear 43 on the output member 13a of the motor 13. The gear 41 surrounds the shaft 34 and is rotatable on two antifriction bearings 42 and 42'. This gear 41 has a hub 44 which, together with this gear, constitutes a drum-shaped component of the clutch 33 and has an abutment or shoulder 45 adjacent a cylindrical extension 46 which is surrounded by some convolutions of the coil spring 32. The remaining convolutions of the spring 32 surround the cylindrical component 40 of the clutch 33. The latter is installed in prestressed condition in such a way that its end convolutions are adjacent the abutments 39 and 45 of the components 40 and 41, 44–46. The spring 32 is prestressed in the circumferential direction, i.e., it is a torsion spring which normally couples the components 40 and 41, 44–46 to each other so that the motor 13 can drive the chain 37. When the motor 13 is on, the spring 32 normally transmits torque from the component 41, 44–46 to the component 40 unless the guard 22 is pivoted out of the way so that the helical spring 25 can expand and depresses the retracting lever 19 with the decoupling element 28 so that the stop 30 intercepts the orbiting end portion 31 of the spring 32 and unwinds it from the component 40 and/or 41, 44–46 to interrupt rotation of the spring 32 with one of these components which enables the gear 43 to rotate independently of the driving member 34. The end portion 30 of the element 28 can be said to constitute an interrupting means or stop for the spring 32. Those windings of the coil spring 32 which surround the component 40 of the clutch 33 perform a braking action which results in rapid or immediate stoppage of the driving member 34, sprocket wheel 36 and chain 37.

The coil spring 32 of the clutch 33 performs a braking action (upon the parts 40, 34, 36 and 37) when the guard 22 is pivoted by the hand 24 of the operator as well as when the hand which holds the handle 2 releases the actuator 4, i.e., when the switch 5 is permitted to open. The actuator 4 is a so-called dead man's key or non-escaping key which automatically permits the switch 5 to open the circuit of the motor 13 when the hand which holds the handle 2 ceases to apply a force that is necessary to close the switch 5 by way of the actuator 4.

The helical spring 25 is normally held in stressed condition by the retracting lever 17 as a result of engagement of the arm 12 of the blocking lever 9 with the right-hand edge face of the free end portion 7 of the actuator 4. Thus, the hand which grasps the handle 2 need not continuously hold the spring 25 against expansion because the lever 17 is locked in the upper end position by the arm 14 of the lever 9. The spring 25 ensures that the arm 10 of the blocking lever 9 normally extends from the housing 1 by way of the opening 11.

When the clutch 33 has been actuated to disengage the components 40 and 41, 44–46 from each other and to arrest the sprocket wheel 36 for the chain 37, it is again necessary to establish a torque transmitting connection between the gear 43 and the sprocket wheel 36. To this end, the operator depresses the arm 10 of the lever 9 into the opening 11 of the housing 1 so that the roller 16 on the arm 18 is free to reenter the socket 15 of the arm 14 under the action of the helical spring 25. In the next step, the hand which holds the handle 2 depresses the actuator 4 so as to start the motor 13 by closing the switch 5 (at such time, the arm 12 and its stop 8 are away from the path of movement of the edge face 6 on the actuator 4). Furthermore, a depression of the arm 10 into the opening 11 results in lifting of the lever 17 under the action of the socket 15 on the arm 14 so that the helical spring 25 stores energy and the stop 30 of the decoupling element 28 is lifted above and away from the end portion 31 of the coil spring 32. The latter is then free to reduce its diameter and to frictionally engage the components 40 and 41, 44–46 of the wrap spring clutch 33. Thus, the sprocket wheel 36 for the chain 37 begins to rotate in immediate response to closing of the switch 5. A spring or the like (not specifically shown) can be provided to bias the guard 22 to its operative position in which the socket 21 of this guard receives the roller 20 on the respective arm 19 of the lever 17. The portable tool is then ready for use and the clutch 33 can be disengaged again, either by permitting the switch 5 to open or by pivoting the guard 22 so as to enable the decoupling element 28 to disengage the clutch 33 by causing the coil spring 32 to move its convolutions out of frictional engagement with the component 41, 44–46.

An important advantage of the improved portable tool is that the clutch 33 constitutes a brake for the part or parts (driving member 34, sprocket wheel 36 and chain 37) which receive torque from the component 41, 44–46 of the clutch 33 when the coil spring 32 is free to transmit torque from the cylinder 46 to the cylinder 40. Otherwise stated, the improved portable tool does not have to be equipped with a discrete brake or it need not be equipped with a discrete clutch because the clutch constitutes a brake or the brake constitutes a clutch. Such construction of the combined clutch and brake contributes to compactness, lower cost and greater reliability of the portable tool because the masses which must be decelerated in response to disengagement of the clutch 33 are relatively small. Moreover, the combined clutch and brake 33 is simple, compact and inexpensive and requires a minimum of maintenance. It has been found that the spring 33 can decelerate the driving member 34 and the parts which are driven thereby within a surprisingly short interval of time, even if the motor 13 is operated at a high speed. The guard 22 can initiate a movement of the stop 30 of the reciprocable decoupling element 28 into the path of orbital movement of the radially outwardly bent portion 31 of the coil spring 32 in immediate response to pivoting of the guard from the normal (first) position, in which the retracting lever 17 causes the spring 25 to store energy, to the other (second) position in which the spring 25 is free to dissipate energy and to thereby move the hub 26 of the lever 17 radially toward the component 41, 44-46 of the clutch 33.

The shoulders 39 and 45 or similar abutments of the two cylinders of the clutch 33 constitute two optional but desirable parts of the improved clutch; they hold the coil spring 32 against undesirable axial movements relative to the cylinders 46 and 40.

The feature that the gear 41, which receives torque from the gear 43 on the output member 13a of the motor 13, forms part of the first component of the clutch 33 contributes to simplicity, compactness and lower cost of the clutch and of the entire portable tool. The mounting of the sprocket wheel 36 in overhung position on the driving member 34 and the feature that a portion of the driving member 34 extends into bearings which are provided therefor in the gear 41 also contributes to compactness and lower cost of the portable tool. Moreover, such mounting of the driving member 34 ensures that the driving member cannot wobble which contributes to longer useful life of the entire portable tool.

The prime mover 13 is or can constitute an electric motor. However, it is equally within the purview of the invention to use a small internal combustion engine. The switch 5 is then replaced with or can constitute a part of the means for starting the engine in response to pivoting of the actuator 4 from its normal position. The blocking lever 9 constitutes a highly desirable and advantageous but optional feature of the improved portable tool.

The guard 22 can be designed with a view to shield a portion of or the entire hand 24 from debris and/or other undesirable influences. The exact configuration of that portion of the guard 22 which projects from the housing 1 forms no part of the invention. All that counts is to design the guard with a view to allow for rapid and convenient actuation by the hand 24 when the need arises.

The helical spring 25 automatically propels the decoupling element 28 to its operative position as soon as the lever 17 is released by the guard 22 and by the arm 14 of the blocking lever 9. The blocking lever 9 can reassume its normal position (in which the arm 10 preferably extends from the housing 1 by way of the opening 11) when the clutch 33 is disengaged by the decoupling element 28.

The decoupling element 28 can be mounted for pivotal movement (or a combined pivotal and reciprocatory movement) into and from the path of orbital movement of the outwardly extending portion 31 of the spring 32.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A portable power-operated tool, particularly a portable chain saw, comprising a housing; a prime mover carried by said housing and having a rotary output member; means for starting said prime mover; manually operable means for normally blocking the operation of said starting means; a rotary tool driving member; a wrap spring clutch interposed between said members to rotate said driving member in response to rotation of said output member, said clutch including a first component which is driven by said output member to rotate in a predetermined direction in response to rotation of said output member, a second component which drives said driving member, and a prestressed coil spring surrounding and normally frictionally engaging said components, said coil spring having convolutions surrounding said components in such orientation that the spring tends to reduce its diameter, to bear against said components and to be driven by said first component due to the prestressing thereof; means for disengaging said clutch including a manually displaceable disengaging element of said housing, said clutch further including means for braking said driving member in response to displacement of said disengaging element so that the driving member is braked substantially simultaneously with the interruption of transmission of torque thereto, said spring including or constituting said braking means and being disengageanble from at least one of said components in response to displacement of said disengaging element, said disengaging means further including means for interrupting the rotation of said spring with said one component in response to displacement of said disengaging element, said spring comprising a portion which extends from said first component and said interrupting means comprising a stop which is engageable with said portion of said spring in response to displacement of said disengaging element to thereby prevent the spring from rotating with said first component; an means for engaging said stop with said portion of said spring in response to blocking of the operation of said starting means by said blocking means, said stop including a reciprocable decoupling element and said engaging means including means for biasing said decoupling element to a position in which said decoupling element extends into the path of movement of said portion of said spring, said disengaging means having retracting means for normally maintaining said decoupling element away from the path of movement of said portion of said spring, said retracting means comprising a retracting lever having a first arm cooperating with said disengaging element and a second arm cooperating with said blocking means, said retracting lever having a hub receiving a portion of said biasing means and reciprocably receiving a portion of said decoupling element.

2. A portable power-operated tool, particularly a portable chain saw, comprising a housing; a prime mover carried by said housing and having a rotary output member; means for starting said prime mover; manually operable means for normally blocking the operation of said starting means; a rotary tool driving member; a wrap spring clutch interposed between said members to rotate said driving member in response to rotation of said output member, said clutch including a first component which is driven by said output member to rotate in a predetermined direction in response to rotation of said output member, a second component which drives said driving member, and a prestressed coil spring surrounding and normally frictionally engaging said components, said coil spring having convolutions surrounding said components in such orientation that the spring tends to reduce its diameter, to bear against said components and to be driven by said first component due to the prestressing thereof; means for disengaging said clutch including a manually displaceable disengaging element on said housing, said clutch further including means for braking said driving member in response to displacement of said disengaging element so that the driving member is braked substantially simultaneously with the interruption of transmission of torque thereto, said spring including or constituting said braking means and being disengageable from at least one of said components in response to displacement of said disengaging element, said disengaging means further including means for interrupting the rotation of said spring with said one component in response to displacement of said disengaging element, said spring comprising a portion which extends from said first component and said interrupting means comprising a stop which is engageable with said portion of said spring in response to displacement of said disengaging element to thereby prevent the spring from rotating with said first component; and means for engaging said stop with said portion of said spring in response to blocking of the operation of said starting means by said blocking means, said stop including a reciprocable decoupling element and said engaging means including means for biasing said decoupling element to a position in which said decoupling element extends into the path of movement of said portion of said spring, said disengaging means having retracting means for normally maintaining said decoupling element away from the path of movement of said portion of said spring, said retracting means comprising a retracting lever having a first arm cooperating with said disengaging element and a second arm cooperating with said blocking means, said disengaging element comprising a guard for the hand holding said housing and being pivotable with reference to said housing between a first position in which said clutch is engaged and a second position in which said clutch is disengaged, said guard having a seat and said first arm having a portion engaging said seat in the first position of said guard, said guard being pivotable to the second position by the hand holding said housing to thereby disengage said seat from said first arm whereby said biasing means is free to move said decoupling element into the path of movement of said portion of said spring.

3. The power-operated tool of claim 1, wherein said first and second components respectively have first and second abutments and said convolutions include first and second end convolutions respectively adjacent said first and second abutments so that the abutments hold the spring against axial movement relative to said components.

4. The power-operated tool of claim 2, wherein said first component includes a first gear and the output member of said prime mover has a second gear in mesh with said first gear, said first component further comprising a hub which is coaxial with said first gear and is surrounded by said spring, said driving member including a portion, which, is surrounded by and is rotatable relative to the hub of said first component.

5. The power-operated tool of claim 4, wherein said driving member is rotatably journalled in said housing adjacent said second component, and further comprising a sprocket wheel mounted on said driving member in overhung position adjacent said second component and a chain trained over said sprocket wheel.

6. The power-operated tool of claim 5, further comprising antifriction bearing means between said portion of said driving member and said hub.

7. The power-operated tool of claim 9, wherein said decoupling element is reciprocable substantially at right angles to the axes of said components.

8. The power-operated tool of claim 1, wherein said decoupling element is movable substantially radially toward and away from said first component and said biasing means comprises means for urging said decoupling element toward said first component.

9. The power-operated tool of claim 1, further comprising friction reducing means interposed between the arms of said retracting lever and said disengaging element and said blocking means, respectively.

10. The power-operated tool of claim 1, wherein said blocking means includes means for preventing the operation of said starting means when said clutch is disengaged.

11. The power-operated tool of claim 10, wherein said starting means comprises a switch and an actuator for said switch, said actuator being movable by hand when said blocking means is disengaged.

12. The power-operated tool of claim 11, wherein said blocking means comprises a blocking lever which is pivotable in said housing and has a first arm which constitutes said preventing means, a second arm which is displaceable by hand to move said first arm away from said actuator, and a third arm arranged to effect the disengagement of said clutch when the first arm of said blocking lever prevents the actuator from closing said switch.

13. The power-operated tool of claim 12 wherein one of said arms of said blocking lever is disposed at right angles to the other arms of said blocking lever and further comprising a retracting lever which normally prevents the stop from disengaging said clutch and is coupled with the third arm of said blocking lever.

14. The power-operated tool of claim 13, wherein said housing has an opening and the second arm of said blocking lever extends from the housing through said opening.

15. The power-operated tool of claim 14, wherein said actuator is pivotable by hand and has a portion which abuts said first arm of said blocking lever and prevents said actuator from closing said switch when said second arm of said blocking lever is not displaced by hand, said third arm having a socket for said retracting lever.

* * * * *